United States Patent
Horagai

(10) Patent No.: US 8,595,643 B2
(45) Date of Patent: Nov. 26, 2013

(54) SCROLLING A SUBSEQUENTLY DISPLAYED BLOCK WITH A DELAY FROM A PREVIOUSLY DISPLAYED BLOCK

(75) Inventor: Jinji Horagai, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 295 days.

(21) Appl. No.: 12/820,298

(22) Filed: Jun. 22, 2010

(65) Prior Publication Data

US 2011/0099509 A1    Apr. 28, 2011

(30) Foreign Application Priority Data

Oct. 28, 2009   (JP) .................................. 2009-248275

(51) Int. Cl.
    *G06F 3/048*    (2013.01)
(52) U.S. Cl.
    USPC ............................ 715/784; 345/684; 715/830
(58) Field of Classification Search
    None
    See application file for complete search history.

(56) References Cited

U.S. PATENT DOCUMENTS

| | | | |
|---|---|---|---|
| 6,199,080 B1 * | 3/2001 | Nielsen ......................... | 715/206 |
| 6,462,752 B1 * | 10/2002 | Ma et al. ....................... | 345/684 |
| 2002/0186251 A1 * | 12/2002 | Himmel et al. ............... | 345/784 |
| 2008/0168478 A1 * | 7/2008 | Platzer et al. ................. | 719/328 |
| 2010/0175027 A1 * | 7/2010 | Young et al. .................. | 715/830 |
| 2011/0090255 A1 * | 4/2011 | Wilson et al. ................. | 345/647 |

OTHER PUBLICATIONS

"Scrolling" retrieved from Wikipedia, http://en.wikipedia.org/wiki/Scrolling. Retrieved on Oct. 27, 2009.

* cited by examiner

*Primary Examiner* — Stephen Hong
*Assistant Examiner* — Asher Kells
(74) *Attorney, Agent, or Firm* — Katten Muchin Rosenman LLP

(57) ABSTRACT

A storage unit is configured to store a document to be displayed in a predetermined display area on a display. An instruction acknowledging unit is configured to receive a scroll instruction signal for scrolling the document displayed in the display area. A range identifying unit is configured to identify a previously displayed block displayed in the display area before the scrolling operation and a subsequently displayed block displayed in the display area as updated by the scrolling operation. A delay control unit is configured to cause the previously displayed block to be scrolled in the display area by the predetermined amount of movement and displayed accordingly, and causing the subsequently displayed block to be scrolled and displayed accordingly with a delay from the previously displayed block.

12 Claims, 8 Drawing Sheets

20

ADVENTURES OF HUCKLEBERRY FINN

Mark Twain

YOU don't know about me without you have read a book by the name of The Adventures of Tom Sawyer; but that ain't no matter. That book was made by Mr. Mark Twain, and he told the truth, mainly. There was things which he stretched, but mainly he told the truth. That is nothing. I never seen anybody but lied one time or another, without it was Aunt Polly, or the widow, or maybe Mary. Aunt t=0
FIG.6A

Adventures of Tom Sawyer; but that ain't no matter. That book was made by Mr. Mark Twain, and he told the truth, mainly. There was things which he stretched, but mainly he told the truth. That is nothing. I never seen anybody but lied one time or another, without it was Aunt Polly, or the widow, or maybe Mary. Aunt Polly-Tom's Aunt Polly, she is-and Mary, and the Widow Douglas is all told t=t₁
FIG.6B mainly. There was things which he stretched, but mainly he told the truth. That is nothing. I never seen anybody but lied one time or another, without it was Aunt Polly, or the widow, or maybe Mary. Aunt Polly-Tom's Aunt Polly, she is-and Mary, and the Widow Douglas is all told about in that book, which is mostly a true book, with some stretchers, as I said before.
Now the way that the book winds up is this: Tom and me found the money that t=t₂
FIG.6C anybody but lied one time or another, without it was Aunt Polly, or the widow, or maybe Mary. Aunt Polly-Tom's Aunt Polly, she is-and Mary, and the Widow Douglas is all told about in that book, which is mostly a true book, with some stretchers, as I said before.
Now the way that the book winds up is this: Tom and me found the money that the robbers hid in the cave, and it made us rich. We got six thousand dollars apiece-all gold. It was an awful sight of money when it was piled up. Well, t=tₑ
FIG.6D

20

ADVENTURES OF HUCKLEBERRY FINN

Mark Twain

YOU don't know about me without you have read a book by the name of The Adventures of Tom Sawyer; but that ain't no matter. That book was made by Mr. Mark Twain, and he told the truth, mainly. There was things which he stretched, but mainly he told the truth. That is nothing. I never seen anybody but lied one time or another, without it was Aunt Polly, or the widow, or maybe Mary. Aunt $t=0$

FIG.7A

Adventures of Tom Sawyer; but that ain't no matter. That book was made by Mr. Mark Twain, and he told the truth, mainly. There was things which he stretched, but mainly he told the truth. That is nothing. I never seen anybody but lied one time or another, without it was Aunt Polly, or the widow, or maybe Mary. Aunt Polly—Tom's Aunt Polly, she is—and Mary, and the Widow Douglas is all told $t=t_1$

FIG.7B mainly. There was things which he stretched, but mainly he told the truth. That is nothing. I never seen anybody but lied one time or another, without it was Aunt Polly, or the widow, or maybe Mary. Aunt Polly—Tom's Aunt Polly, she is—and Mary, and the Widow Douglas is all told about in that book, which is mostly a true book, with some stretchers, as I said before.

Now the way that the book winds up is this: Tom and me found the money that $t=t_2$

FIG.7C anybody but lied one time or another, without it was Aunt Polly, or the widow, or maybe Mary. Aunt Polly—Tom's Aunt Polly, she is—and Mary, and the Widow Douglas is all told about in that book, which is mostly a true book, with some stretchers, as I said before.

Now the way that the book winds up is this: Tom and me found the money that the robbers hid in the cave, and it made us rich. We got six thousand dollars apiece—all gold. It was an awful sight of money when it was piled up. Well, $t=t_e$

FIG.7D

SCROLLING A SUBSEQUENTLY DISPLAYED BLOCK WITH A DELAY FROM A PREVIOUSLY DISPLAYED BLOCK

BACKGROUND OF THE INVENTION

1. Field of the Invention

The present invention relates to a technology of scrolling the screen as displayed in accordance with a user instruction for scrolling.

2. Description of the Related Art

Recently, users of small electronic devices such as cell phones, personal digital assistants (PDA), or portable game devices often view documents such as news, blogs, or novels outdoors. Generally, the display of these small electronic devices is considerably small in comparison with, for example, personal computers. Therefore, users reading a document of a certain length need to repeat scrolling the document in the on-screen display in order to read it.

[Non-Patent Document No. 1]
"Scrolling", [online], Wikipedia, retrieved by search on Oct. 27, 2009, Internet <URL: http://en.wikipedia.org/wiki/Scrolling>

When several lines of a document is scrolled or the screen is scrolled halfway, the portion displayed before the scroll operation and the portion displayed for the first time after the scroll operation are displayed concurrently in the screen. This may sometimes make it difficult to readily recognize the portion already read. If the scroll is allowed to occur one line at a time in order to avoid the above-described problem, the user is forced to repeat pressing the scroll button, thus complicating the user operation.

SUMMARY OF THE INVENTION

The present invention addresses the drawback described above and a purpose thereof is to provide a technology of ensuring that the user can easily distinguish between the portion already read and the portion not read yet as the user scroll and display a document that does not fit the display area in its entirety.

One embodiment of the present invention relates to a scroll display program. The program comprises: a storage module configured to store in a memory a document to be displayed in a predetermined display area on a display; an instruction acknowledging module configured to receive a scroll instruction signal for scrolling the document displayed in the display area; a range identifying module configured to refer to the document in the memory and identify, in according with a predetermined amount of movement, a previously displayed block displayed in the display area before the scrolling operation and a subsequently displayed block displayed in the display area as updated by the scrolling operation; and a delay control module configured to output an image signal to the display, the image signal causing the previously displayed block to be scrolled in the display area by the predetermined amount of movement and displayed accordingly, and causing the subsequently displayed block to be scrolled and displayed accordingly with a delay from the previously displayed block.

According to the embodiment, the previously displayed block displayed on the screen before the scrolling operation, i.e., the portion already read by the user, is scrolled and displayed accordingly, and the subsequently displayed block displayed on the screen for the first time after the scrolling operation is scrolled and displayed accordingly with a delay from the previously displayed block. This causes a blank area to be displayed between the previously displayed block and the subsequently displayed block while the document is being scrolled so that the user can clearly distinguish between the portion already read and the portion not read yet.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 6A-6D show an example of how the displayed screen changes under delayed scroll control;

FIGS. 7A-7D show another example of how the displayed screen changes under delayed scroll control.

DETAILED DESCRIPTION OF THE INVENTION

The invention will now be described by reference to the preferred embodiments. This does not intend to limit the scope of the present invention, but to exemplify the invention.

Figure 1:
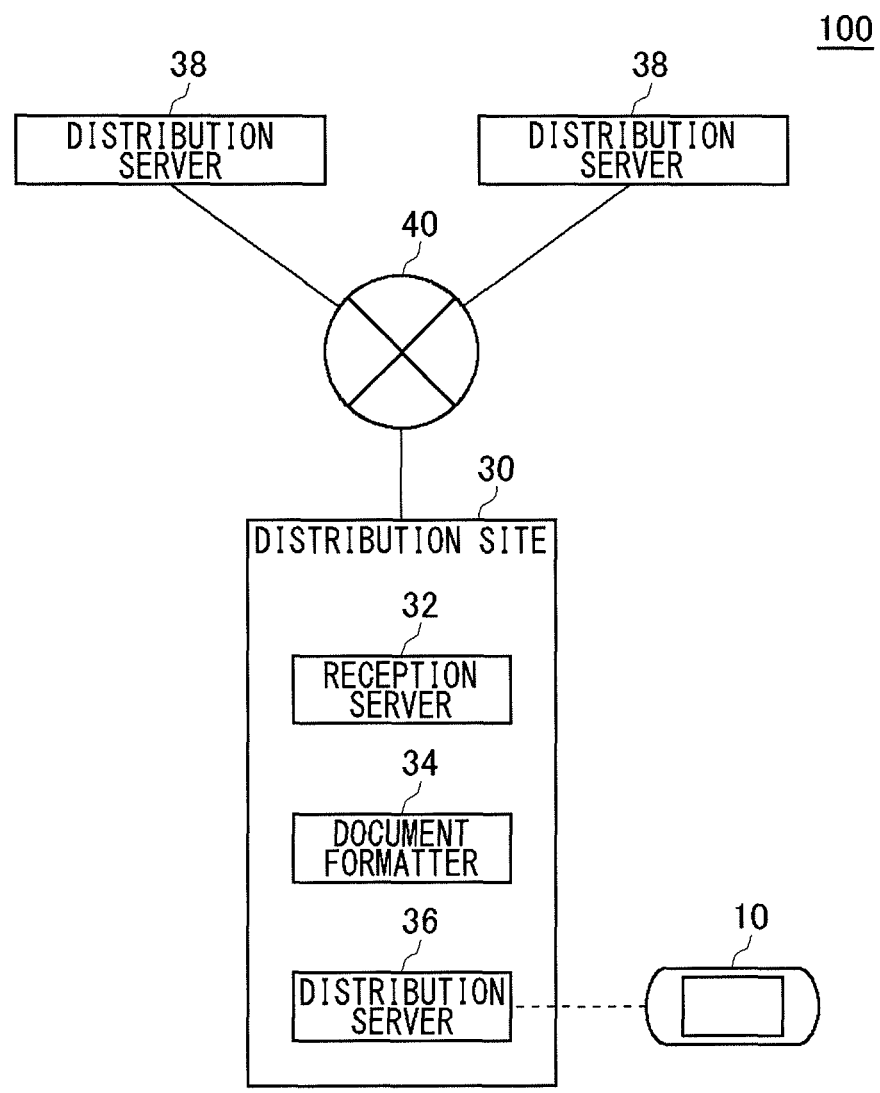
FIG. 1 is a general, schematic view of a network configuration including a portable electronic device provided with a scroll display device according to an embodiment of the present invention.

FIG. 1 is a general, schematic view of a network configuration including a portable electronic device 10 provided with a scroll display device according to an embodiment of the present invention. The portable electronic device 10 receives a document distributed from a distribution site 330 and optimized for view on the device 10, and displays the document on the display of the device 10.

A distribution source server 38 is installed in a media firm such as a newspaper company or in a service provider. The server 38 delivers document contents such as news articles, blog articles, novels, etc. viewed on the portable electronic device 10. The reception server 32 of the distribution site 30 receives a document content via the network 40. A document content is generally described in a markup language such as HTML, SHTML, XML. Therefore, a document formatter 34 of the distribution site 30 converts a document content stored in the reception server 32 into a predetermined appropriate format for view on the display of the portable electronic device 10. Hereinafter, the document thus converted will be referred to as a "formatted document". By way of example, a format comprises a body of text and a style sheet that defines the number of characters, fonts, etc. in the text. The pair comprising the text body and the style sheet is distributed to the portable electronic device 10. The formatting facilitates control (described later) by the portable electronic device 10.

Formatting of a document allows flexible control of the display mode of a document displayed on the display 12 of the portable electronic device 10, by defining a document style such as the number of lines in a document, the number of characters per one line, line spacing, character spacing, etc. Formatting also makes it easy to recognize the portion of a formatted document that fits within the display, as described later. In this regard, a formatted document is desirably of a format comprising a text body and a style sheet. However, a document may be distributed to the portable electronic device 10, retaining the format of a markup language such as HTML. The document formatter 34 may convert a document content into a format for saving in a predefined word processor or a PDF format. A document may include an image or a hyperlink in addition to the text.

The distribution server 36 suitably distributes the document to a distribution station located in a public space. The user of the portable electronic device 10 receives the formatted document stored in the distribution station using wireless LAN (e.g., IEEE802.11a/b/g), infrared communication (e.g., IrDA), or cable communication. Alternatively, the portable electronic device 10 may connect to the Internet via a wireless LAN point and directly receive the formatted document from the distribution server 36. Still alternatively, the device 10 may read the formatted document recorded in a predetermined external recording medium.

Figure 2:
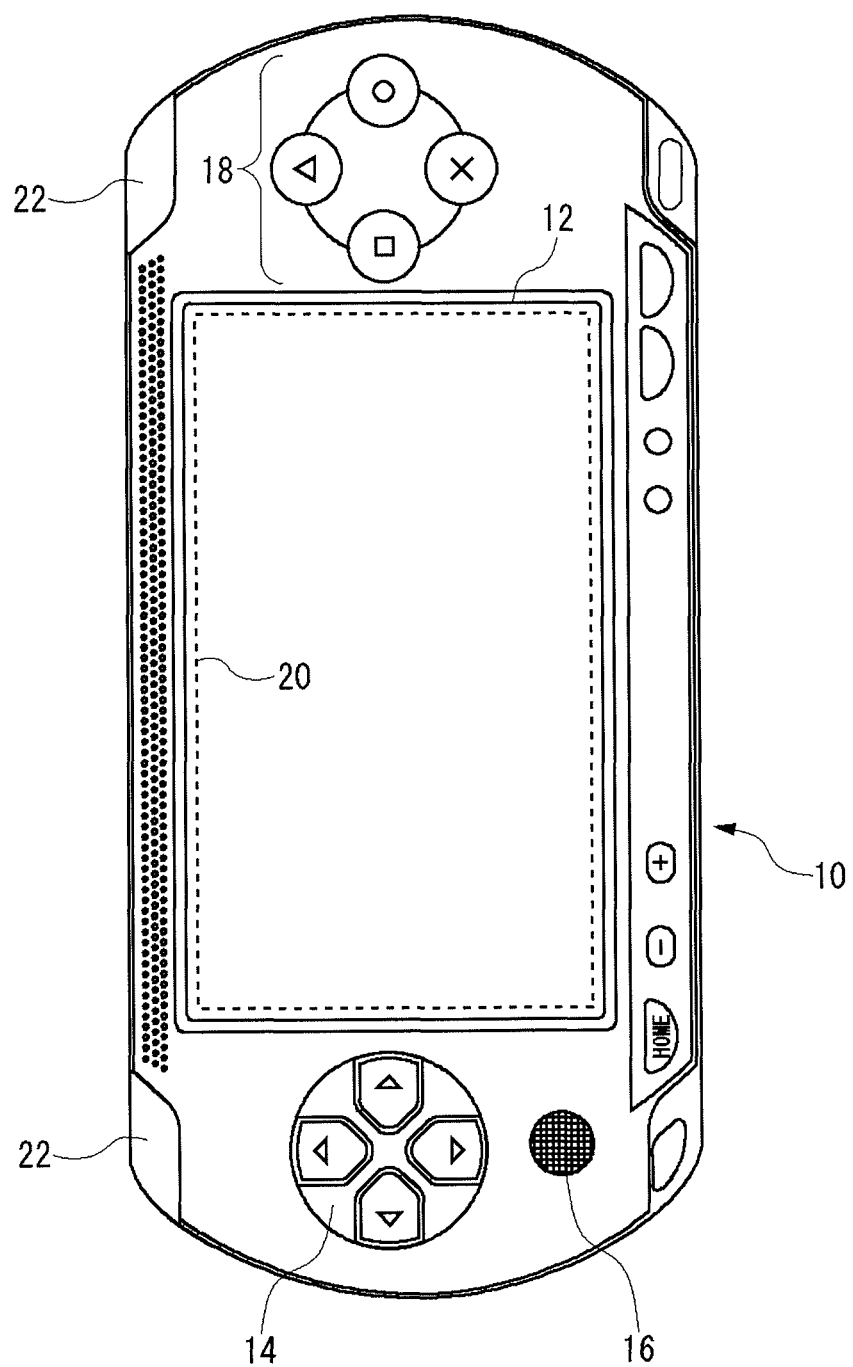
FIG. 2 is a schematic overview of the portable electronic device.

FIG. 2 is a schematic overview of the portable electronic device 10. In addition to the function of displaying the formatted document distributed from the distribution server 36, the portable electronic device 10 may be provided with the function of playing digital contents such as moving images, still images, music, etc. or the function of running contents such as game programs.

The portable electronic device 10 is provided with a display 12 such as a liquid crystal display (LCD) and keys, including directional keys 14, an analog stick 16, button keys 18, LR keys 22, etc. The button keys 18 comprise four buttons formed by engraving the top surface of the key pad with the shapes of a circle, cross, square, and triangle, or by printing these shapes on the surface. The user holds the left and right ends of the portable electronic device 10 with both hands when playing a digital content or running a game. The user indicates a vertical or horizontal direction primarily by using the directional keys 14 or the analog stick 16 with the left thumb and performs various operations primarily by using the button keys 18 with the right thumb.

However, the device 10 is assumed to be held for use such that the display 12 is longitudinally oriented as shown in FIG. 2. This is because the display 12 longitudinally oriented provides better viewability when a horizontally written formatted document is displayed. However, the device 10 may be held for use such that the display 12 is horizontally oriented. For this reason, it is favorable that the portable electronic device 10 be configured to display an on-screen menu prompting the user to select whether to display the formatted document in a vertical orientation or a horizontal orientation.

The portable electronic device 10 is further provided with a USB port, an infrared port, wireless LAN communication functionality (not shown) and receives data from a distribution server or a distribution station via any of these ports or the communication function. The portable electronic device 10 can use a small optical disk or a memory card as an external recording medium. The disk or the card is loaded in a drive (not shown) of the portable electronic device 10. The communication function or the external recording medium may not be provided in the device.

An on-screen menu using a Graphical User Interface (GUI) is displayed on the display 12 of the portable electronic device 10 so that the user can select a menu item using various keys. Since the display area 20 of the display 12 is limited in size, a relatively long formatted document on display should be scrolled up and down. For this reason, any one or a plurality of the aforementioned keys is assigned a scroll indication function while the formatted document is being displayed. For example, the user may indicate an upward or downward scrolling operation by indicating the upward movement or downward movement using the directional keys 14, or indicate an upward or downward scrolling operation with the corresponding one of the LR keys. Alternatively, if the display is provided with a touch panel, the user may indicate a scrolling operation by swiping the finger across the display upward or downward. In the following description, any scroll operation initiated by the user using an arbitrary means such as a key, panel, etc. will be simply referred to as "scroll instruction".

The term "display area" refers to an area on the display in which a document is scrolled and displayed accordingly. A display area is identical in size to the screen when the document is scrolled and displayed accordingly in the entirety of the display screen. When the screen is divided into a plurality of sections and the document is scrolled and displayed accordingly only in one or some of the sections, the section represents a display area. There may be a plurality of display areas in the display screen. For example, when two windows are displayed and the document is selectively scrolled and displayed accordingly in both of the two windows, each window represents a display area.

Figure 3:
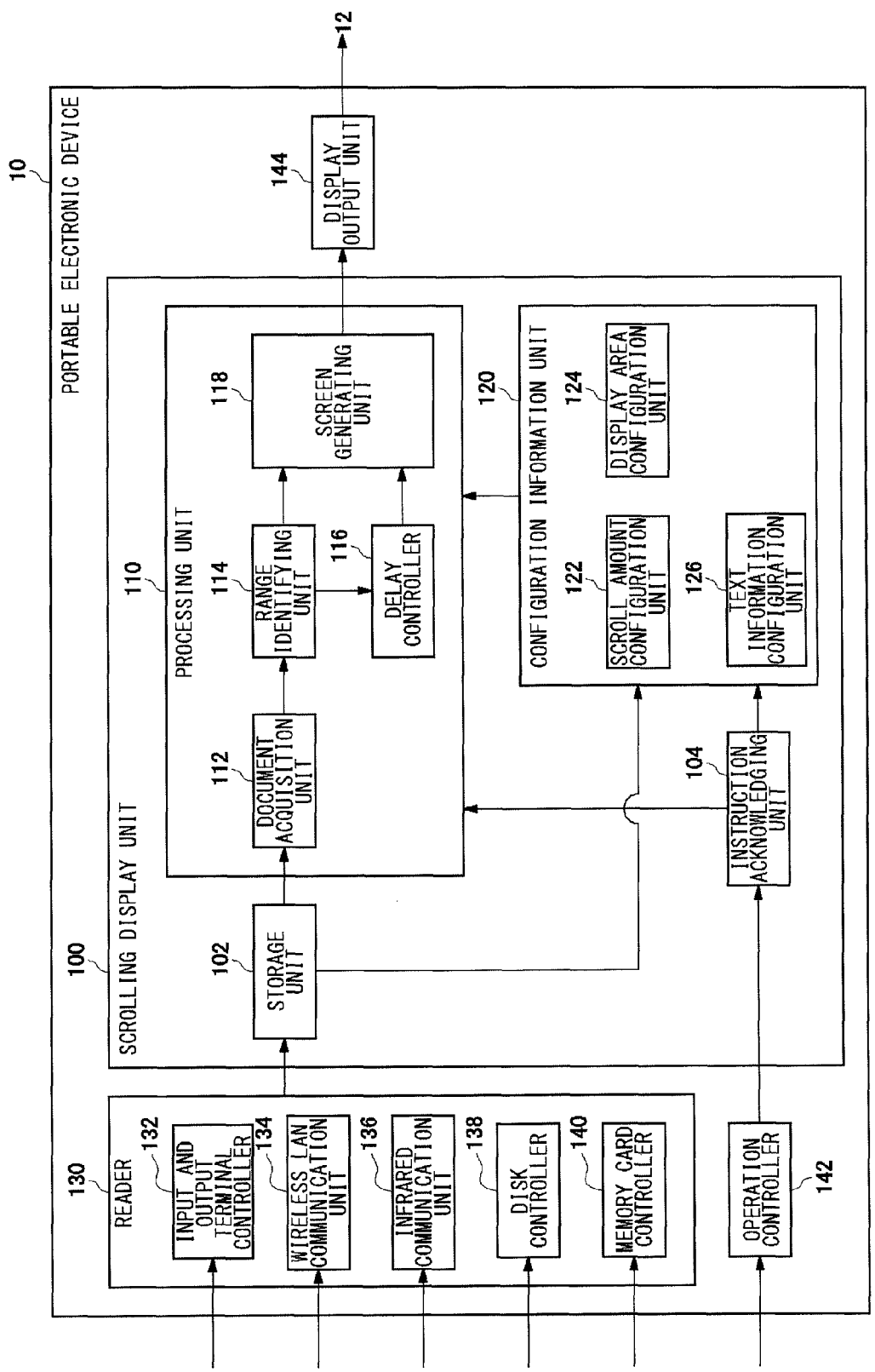
FIG. 3 shows the configuration of the parts of the portable electronic device of FIG. 2 related to the delayed scroll display control according to the embodiment.

FIG. 3 shows the configuration of the parts of the portable electronic device 10 of FIG. 2 related to the delayed scroll display control according to the embodiment. These parts are implemented by a hardware configuration such as a CPU, RAM, ROM, rendering circuit, etc. and by a software program equipped with the functions of data entry, data storage, image processing, rendering, etc. FIG. 3 depicts the functional blocks implemented by the coordination of hardware and software. Therefore, these functional blocks can be implemented in a variety of manners using combinations of hardware, software, etc.

A reader 130 receives a formatted document from the distribution server or the distribution station. Alternatively, the reader 130 receives a formatted document from an external recording medium. A wireless LAN communication unit 134 and an infrared communication unit 136 each receives a formatted document from the distribution station using wireless LAN communication and infrared communication, respectively. An input and output terminal controller 132, a disk controller 138, and a memory card controller 140 each reads a formatted document from a USB device, optical disk, and memory card, respectively. The formatted document once received or read is temporarily stored in a storage unit 102.

An operation controller 142 receives an operation initiated by the user via, for example, various keys of the portable electronic device 10 and converts the operation into an instruction determined by the type of key and the content displayed on the display 12. For example, the controller 142 interprets a key operation performed while a formatted document is being displayed on the display 12 as an instruction for a scrolling operation or as an instruction to identify an item in the on-screen menu, which is described later. A key operation performed while an on-screen menu is displayed on the display 12 may be interpreted as selection of an item in the on-screen menu.

A scrolling display unit 100 comprises a storage unit 102, an instruction acknowledging unit 104, a processing unit 110, and a configuration information unit 120.

The storage unit 102 stores a formatted document to be displayed on the display. As mentioned above, a formatted document comprises a body of text and a style sheet.

The instruction acknowledging unit 104 receives an instruction converted by the operation controller 142 and delivers the instruction to a corresponding block. When a scrolling operation is requested by an instruction, the request is transmitted to the processing unit 110. When the instruction is directed to a change in the amount of scroll or scrolling speed, enlargement or reduction of a font, the request is transmitted to the configuration information unit 120.

The processing unit 110 comprises a document acquisition unit 112, a range identifying unit 114, a delay controller 116, and a screen generating unit 118.

The document acquisition unit 112 acquires a formatted document to be displayed from the storage unit 102.

The range identifying unit 114 identifies a previously displayed block of the formatted document, which is a range displayed in the display area 20 of the display 12 before the scrolling operation and a subsequently displayed block displayed in the display area 20 as updated by the scrolling operation. For identification, the range identifying unit 114 acquires information such as the amount of scroll, size of the display area, number of lines in the formatted document, number of characters in the document, line spacing, character spacing, character size, from the configuration information unit 120 described later.

When delayed scroll according to the embodiment is selected, the delay controller 116 determines, in accordance with the user instruction for a scrolling operation, the speed of scrolling of the previously displayed block and the subsequently displayed block as well as the timing of starting and ending the scrolling operation, so that the subsequently displayed block is scrolled and displayed accordingly in the display area 20 with a time delay with respect to the previously displayed block. For determination, the delay controller 116 acquires information such as the amount of scroll, scroll speed from the configuration information unit 120 described later.

The screen generating unit 118 receives the previously displayed block and the subsequently displayed block from the range identifying unit 114 and generates a screen at a predetermined frame rate such that the screen shows the previously displayed block and the subsequently displayed block having moved in accordance with the scroll speed and scroll timing determined by the delay controller 116. The display output unit 144 outputs the screen thus generated to the display 12 according to an appropriate timing schedule.

The configuration information unit 120 controls various configuration information required for scroll display. The configuration information unit 120 comprises a scroll amount configuration unit 122, a display area configuration unit 124, and a text information configuration unit 126.

The scroll amount configuration unit 122 configures the amount of scroll occurring when the user gives an instruction for a scrolling operation. The scroll amount can be configured by the user using an on-screen menu (not shown). For example, the user may select: 1. scroll one line at a time; 2. scroll a plurality of lines (e.g., five lines) at a time; and 3. delay scroll according to the embodiment.

The scroll amount configuration unit 122 may also configure the scroll speed. The scroll speed can also be selected by the user using an on-screen menu (not shown). Initially, the speed is set to, for example, five lines per second.

The display area configuration unit 124 stores information on the size of the display area 20. Initially the size of the display area 20 is approximately identical to the size of the display 12. When multiple windows are displayed or when the display area for a document is limited, the associated size information is stored.

The text information configuration unit 126 acquires a style sheet of the formatted document from the storage unit 102 and stores the sheet. In one embodiment, the text information configuration unit 126 may be configured to display an on-screen menu that prompts the user to select the character size of the formatted document.

A description will now be given of the operation according to the embodiment. When the user gives an instruction for a scrolling operation, the instruction acknowledging unit 104 delivers the instruction to the processing unit 110. The range identifying unit 114 identifies a previously displayed block of the formatted document, which is a range displayed in the display area 20 of the display 12 before the scrolling operation and a subsequently displayed block displayed in the display area 20 as updated by the scrolling operation. When delayed scroll according to the embodiment is selected, the delay controller 116 determines, in accordance with the user instruction for a scrolling operation, the speed of scrolling the previously displayed block and the subsequently displayed block as well as the timing of starting and ending the scrolling operation, so that the subsequently displayed block is scrolled and displayed accordingly in the display area 20 with a time delay with respect to the previously displayed block. The screen generating unit 118 receives the previously displayed block and the subsequently displayed block from the range identifying unit 114 and generates a screen at a predetermined frame rate such that the screen shows the previously displayed block and the subsequently displayed block having moved in accordance with the scroll speed and scroll timing determined by the delay controller 116.

Figure 4C:
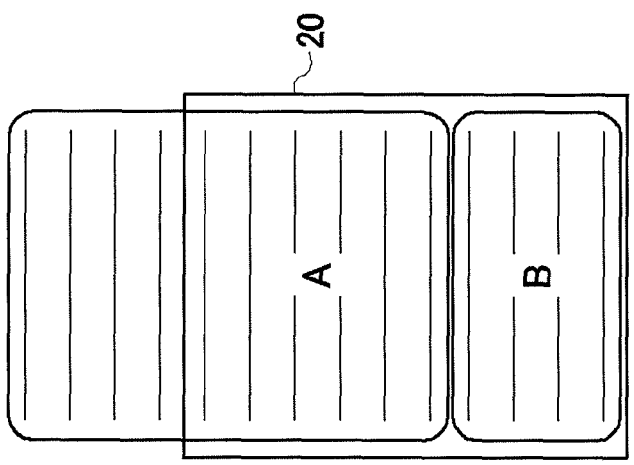
FIGS. 4A-4C show the method implemented by the range identifying unit to identify a previously displayed block and a subsequently displayed block.
Figure 4B:
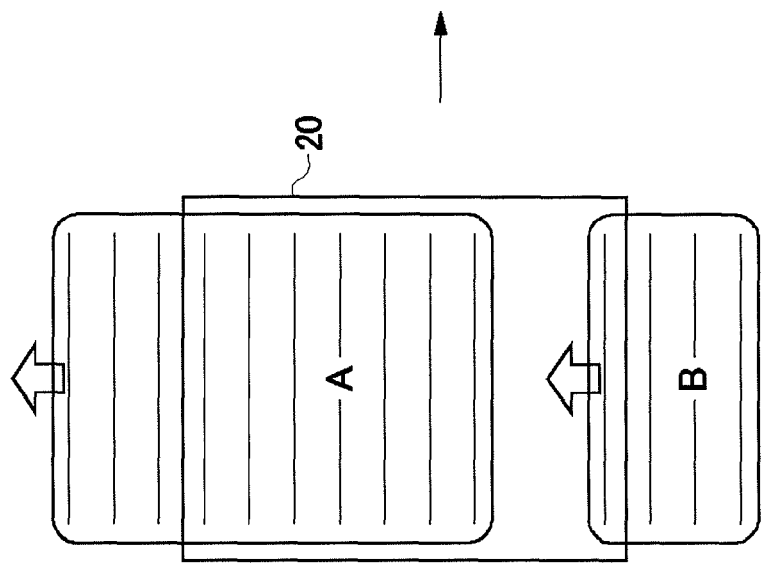
Figure 4A:
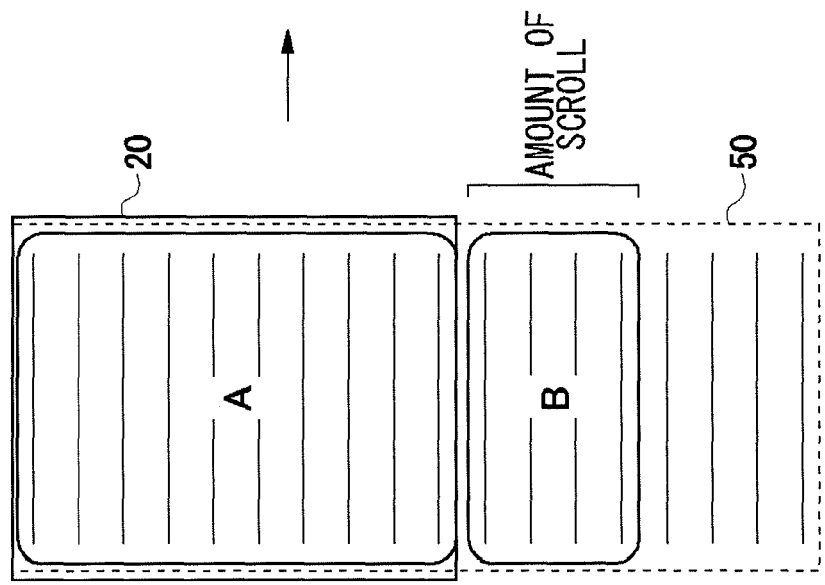

FIGS. 4A-4C show the method implemented by the range identifying unit 114 to identify a previously displayed block and a subsequently displayed block. Referring to FIG. 4A, the square in solid lines indicates the display area 20 of the display 12. The square 50 in the dotted lines indicates the entirety of the formatted document. The horizontal lines in the formatted document indicate character strings.

Referring to FIG. 4A, the volume of the formatted document exceeds the size of the display area 20 so that the latter half of the document is not displayed. Upon receipt of an instruction for a scrolling operation, the range identifying unit 114 identifies the portion displayed in the display area 20 at that point of time as a previously displayed block A. Identification is done by referring to the size of the display area 20, the number of characters in the formatted document, number of lines in the document, character spacing, line spacing, and character size. Further, in accordance with a predetermined amount of scroll (in the illustrated case, four lines), the range identifying unit 114 identifies the portion scheduled to be displayed in the display area 20 after the scroll operation as the subsequently displayed block B.

As mentioned above, the information including the number of characters in the formatted document, number of lines in the document, character spacing, line spacing, etc. is described in the style sheet. Therefore, the range identifying unit 114 is capable of identifying the previously displayed block and the subsequently displayed block easily. Further, when the character size is changed in the portable electronic device 10, the unit 114 is capable of identifying the previously displayed block and the subsequently displayed block in accordance with information such as the number of characters, number of lines, etc.

In case a part of the last line of the document remains displayed in the display area 20 (e.g., the upper half of a character is displayed), it is preferable that the range identifying unit 114 configures the subsequently displayed block such that the last line should be the first line in the subsequently displayed block.

As shown in FIG. 4B, when the scroll operation is started, the delay controller 116 controls the display such that the subsequently displayed block B moves slower than the previously displayed block A. This results in a blank being displayed between the previously displayed block A and the subsequently displayed block B. This allows the user to clearly distinguish between the previously displayed block (i.e., the portion already read) and the subsequently displayed block (i.e., the portion not read yet).

As shown in FIG. 4C, when the scrolling operation is completed, the latter part of the previously displayed block A and the entirety of the subsequently displayed block B are displayed in the display area 20. It is preferable that the gap between the previously displayed block and the subsequently displayed block returns to a normal line space (i.e., line space occurring when the document is displayed in a static manner). However, a blank of a predetermined width (e.g., one line) may remain between the blocks.

FIGS. 5A-5E show the method of controlling the speed of the previously displayed block A and the subsequently displayed block B performed by the delay controller 116.

Figure 5A:
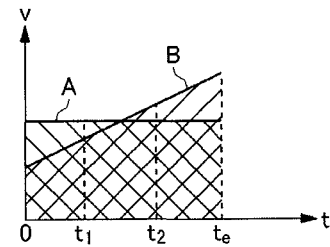
FIGS. 5A-5E show the method of controlling the speed of the previously displayed block and the subsequently displayed block performed by the delay controller.
Figure 5B:
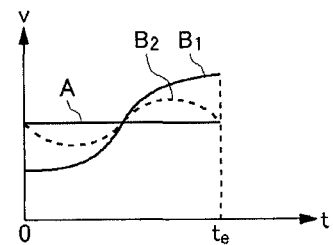

FIG. 5A shows speed control performed when the scrolling of the previously displayed block A and the scrolling of the subsequently displayed block B start and end at the same time. In this case, the delay controller 116 configures the moving speed of the subsequently displayed block B to be lower than the moving speed of the previously displayed block A. Therefore, a blank is displayed between the blocks while the blocks are being scrolled. In order for the previously displayed block A and the subsequently displayed block B to become stationary at the same time when the blocks have been scrolled, the blocks have to move the same distance. Therefore, the delay controller 116 gradually increases the moving speed of the subsequently displayed block B as illustrated. As a result, the areas swept by the blocks A and B become equal so that the moving distances of the blocks become equal.

The speeds of the previously displayed block A and the subsequently displayed block B may change in any manner so long as the areas swept by the blocks A and B are equal. For example, the delay controller 116 may control the speed of the subsequently displayed block B as shown B1 or B2 of FIG. 5B.

Figure 5C:
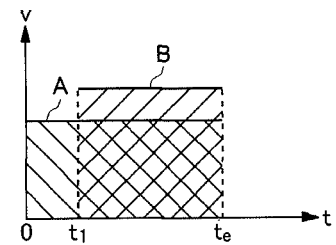

FIG. 5C shows speed control performed when the scrolling of the previously displayed block A and the scrolling of the subsequently displayed block B start at different points of time but the scrolling of A and the scrolling of B end at the same time. In this example, the previously displayed block A starts moving at t=0, but the subsequently displayed block B starts moving at t=t1 (e.g., 0.2 sec). Therefore, the delay controller 116 configures the moving speed of the subsequently displayed block B to be larger than that of the previously displayed block A so that the areas swept by A and B are equal at the end of the scrolling t=te.

Figure 5D:
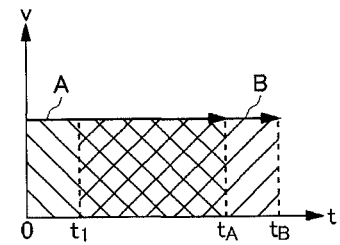
Figure 5E:
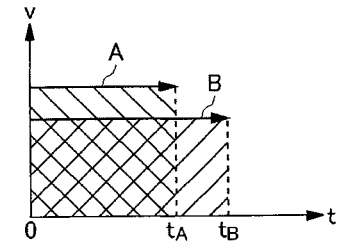

The above description assumes that the previously displayed block A and the subsequently displayed block B become stationary at the same time. Alternatively, the subsequently displayed block B may become stationary after the movement of the previously displayed block A is completed. FIGS. 5D and 5E show speed control performed in this case. Referring to FIG. 5D, the subsequently displayed block B starts moving at t=t1. Since the moving speed of B is equal to that of the previously displayed block A, the scrolling of the previously displayed block A and the scrolling of the subsequently displayed block B end at different points of time. In an yet another alternative, the subsequently displayed block B may start moving after the movement of the previously displayed block A is completed. The subsequently displayed block may be displayed immediately after the movement of the previously displayed block is completed. Referring to FIG. 5E, the previously displayed block A and the subsequently displayed block B start moving at the same time. However, since the moving speed of the previously displayed block A is higher, the block A becomes stationary earlier than the subsequently displayed block B.

A map that predefines the speed of the subsequently displayed block B according to the scroll speed or the amount of scroll of the previously displayed block A may be maintained so that the delay controller 116 reads the map for use. The delay controller 116 may repeat computing the speed each time an instruction for a scrolling operation is given. Previous results of computing may be maintained so that the controller 116 refers to the results as the need arises.

The delay controller 116 may perform other type of speed control so long as it is ensured that a blank is displayed between the previously displayed block A and the subsequently displayed block B. For example, the delay controller 116 may determine the speeds of the previously displayed block A and the subsequently displayed block B so that the time required for scrolling (in the example of FIG. 5A, te) remains constant (e.g., one second) irrespective of the amount of scroll.

FIGS. 6A-6D show an example of how the displayed screen changes under delayed scroll control. FIGS. 6A-6D show the display modes of the display area 20 respectively corresponding to t=0, t1, t2, and te shown in FIG. 5A. When an instruction for a scrolling operation is given in FIG. 6A, a blank is displayed at t=t1 between the blocks because the moving speed of the subsequently displayed block is lower than that of the previously displayed block (FIG. 6B). Subsequently, the moving speed of the subsequently displayed block exceeds that of the previously displayed block at t=t2 so that the width of the blank is decreased (FIG. 6C). At t=te, the previously displayed block and the subsequently displayed block are displayed with a normal line space between the blocks (FIG. 6D). When the user gives an instruction for a scrolling operation for a second time, the range identifying unit 114 identifies the previously displayed block and the subsequently displayed block for a second time so that similar control is repeated.

FIGS. 7A-7D show another example of how the displayed screen changes under delayed scroll control. In this example, too, FIG. 7A-7D show the display modes of the display area 20 respectively corresponding to t=0, t1, t2, and te shown in FIG. 5A. In this example, concurrently with delaying the subsequently displayed block, the screen generating unit 118 displays a partition line at the end of the previously displayed block only while the blocks are being scrolled (FIGS. 7B and 7C). This allows the user to identify the last part of the previously displayed block even more clearly. Preferably, the partition line has a noticeable color (e.g., red). The line is removed when the scrolling operation is completed.

Apart from the aforementioned examples, the screen generating unit 118 may generate a scroll screen by reflecting one or a combination of the following image processes or text modifications in addition to performing delayed scroll control. For example, the background colors, character colors, character fonts, character modifications (e.g., underlines) may differ in the previously displayed block and in the subsequently displayed block while the blocks are being scrolled. By way of one example, the characters of the previously displayed block may be displayed in gray while the block is being scrolled and are returned to the original shade when the scrolling operation is completed. Alternatively, the characters of the subsequently displayed block may be displayed in a noticeable color such as red and are returned to black when the scrolling operation is completed.

Figure 8:
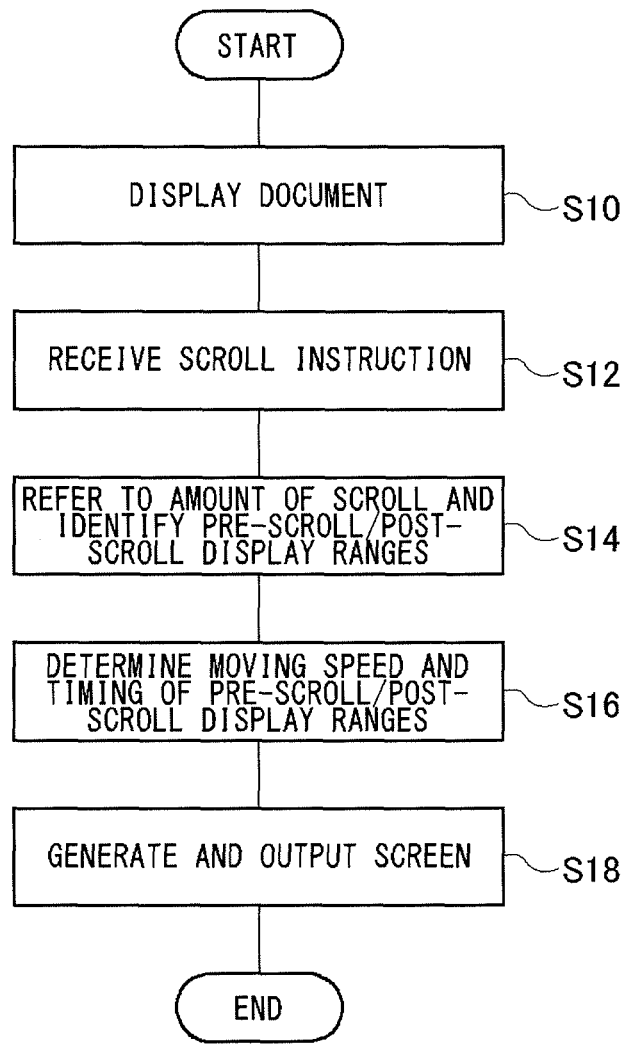
FIG. 8 is a flowchart of delayed scroll display control according to the embodiment.

FIG. 8 is a flowchart of delayed scroll display control according to the embodiment. First, the screen generating unit 118 displays the head of a formatted document in the display area 20 of the display 12 (S10). When the instruction acknowledging unit 104 acknowledges an instruction for a scrolling operation indicated by the user pressing a scroll button (S12), the range identifying unit 114 identifies the previously displayed block and the subsequently displayed block in the formatted document by referring to the amount of scroll, number of characters in the document, character size, etc. (S14). The delay controller 116 determines the moving speed of the subsequently displayed block as well as the timing of starting and ending the scrolling operation under certain conditions (S16). The screen generating unit 118 generates a screen at a predetermined frame rate such that the screen shows the previously displayed block and the subsequently displayed block having moved at the respective speeds from a point of time when the scrolling operation is started. The unit 118 outputs the screen to the display 12 via the display output unit 144 (S18).

As described above, according to the embodiment, the previously displayed block is scrolled and displayed accordingly at a predetermined moving speed when an instruction for a scrolling operation is acknowledged from the user, and the subsequently displayed block is scrolled and displayed accordingly with a delay from the previously displayed block. As a result, a blank is displayed between the previously displayed block and the subsequently displayed block. Therefore, the user can distinguish between the portion that is already read and the portion not read yet even if the document is long and so can view the document with ease. The feature is particularly useful when the user views a document while standing in outdoors or in a train, using a portable electronic device with a small display.

Given above is an explanation of the present invention based on several embodiments. These embodiments are intended to be illustrative only and it will be obvious to those skilled in the art that various modifications to constituting elements and processes could be developed and that such modifications are also within the scope of the present invention. A description will now be given of a variation to the embodiment.

The description of the embodiment assumes that the formatted document only comprises texts. Alternatively, the document may comprise images. When a part of an image is included in the subsequently displayed block, the range identifying unit 114 may extend the subsequently displayed block so that the entirety of the image is included irrespective of the amount of scroll selected. Alternatively, the unit 114 may narrow the subsequently displayed block so that the block immediately follows the image, thereby ensuring that the entirety of the image is displayed in the subsequent scrolling operation. This allows the screen generating unit 118 to generate a screen that includes the entirety of the image so that the user can view the entirety of the image at a glance without repeating instructions for a scrolling operation.

The formatted document may not be a long document as shown in FIGS. 6A-6D and FIGS. 7A-7D and may comprise complete sentences on lines by themselves such as news titles. In this case, the screen generating unit 118 may display the fonts of the portion in focus larger than elsewhere, while the document is being scrolled.

The description of the embodiment assumes that the document in the display area is scrolled downward, i.e., that the user continues to read portions that are not read. Conversely, when the document in the display area is scrolled upward, i.e., when the user reads the portion already read again, delay control may be performed such that a blank is displayed between the previously displayed block and the subsequently displayed block or the blocks may be scrolled and displayed normally without a blank. Preferably, the portable electronic device is configured to allow the user to select delayed vertical scroll or normal vertical scroll in an on-screen menu on the display.

The description of the embodiment assumes that the document as displayed is written horizontally and scrolled vertically. The present invention is also used in a case where the document as displayed is vertically written and scrolled horizontally. Preferably, the portable electronic device 10 is configured to allow the user to select to display a horizontally written document or a vertically written document in an on-screen menu on the display.

The description of the embodiment assumes that the document formatter is provided in the distribution site. Alternatively, the portable electronic device 10 may be configured to directly receive a document written in a format such as HTML and convert the document into a desired format inside the device 10. Still alternatively, the document formatter may not be provided in the distribution site or the device 10 so that the document written in a format such as HTML may be displayed in the display area of the device 10 without any formatting.

The description of the embodiment concerns the portable electronic device 10 with a small display. The present invention is equally applicable to any cell phones, PDAs, game devices, etc. provided with a display. The present invention is also applicable to devices such as desktop personal computers (PC), liquid crystal television sets, etc. provided with a display with a relatively large display area. In the latter case, when the document is displayed in the entirety of the display, the inventive delay control may be used so that the portion not read yet is displayed with a delay. Alternatively, when the document is displayed in a window of arbitrary size in the display, the inventive delay control may be used only within the window. In this case, the operating system of the PC may be equipped with the function related to delay control. Alternatively, application software such as a word processor for displaying the document in the window may be provided with the function. In another alternative, the hardware of the PC may be provided with the function related to delay control.

What is claimed is:

1. A scroll display program embedded in a non-transitory recording medium, comprising:
   a storage module configured to store in a memory a document to be displayed in a predetermined display area on a display;
   an instruction acknowledging module configured to receive a scroll instruction signal for scrolling the document displayed in the display area;
   a range identifying module configured to refer to the document in the memory and identify, in according with a predetermined amount of movement, a previously displayed block displayed in the display area before scrolling and a subsequently displayed block displayed in the display area as updated by scrolling; and a delay control module configured to output an image signal to the display, the image signal causing the previously displayed block to be scrolled in the display area by the predetermined amount of movement and displayed accordingly, and causing the subsequently displayed block to be scrolled and displayed accordingly with a delay from the previously displayed block, wherein the delay control module causes the previously displayed block and the subsequently displayed block to be moved in the display area while the document is being scrolled, causing a line spacing between the previously displayed block and the subsequently displayed block to grow larger than a static line spacing between the blocks when the document is displayed in a static manner, and, after scrolling is completed, shrinking the line spacing between the blocks to the size of the static line spacing.

2. The scroll display program according to claim 1, wherein the delay control module configures the moving speed of the subsequently displayed block to be lower than the moving speed of the previously displayed block at least when the scrolling operation is started.

3. The scroll display program according to claim 1, wherein the delay control module configures the moving speed of the subsequently displayed block to be higher than the moving speed of the previously displayed block when the scrolling operation is near completion.

4. The scroll display program according to claim 1, wherein the delay control module delays the timing of starting scrolling the subsequently displayed block with respect to the timing of starting scrolling the previously displayed block.

5. The scroll display program according to claim 1, wherein the delay control module controls a moving speed of the previously displayed block and the subsequently displayed block so that the previously displayed block and the subsequently displayed block become stationary substantially at the same time when scrolling is completed.

6. The scroll display program according to claim 1, wherein the range identifying module identifies the previously displayed block and the subsequently displayed block in the document based on the predetermined amount of movement.

7. The scroll display program according to claim 6, wherein, when a part of the last line of the previously displayed block is displayed in the display area, the range identifying module identifies the subsequently displayed block, placing the last line at the head.

8. The scroll display program according to claim 1, wherein, when a part of an image is included in the subsequently displayed block, the range identifying module extends a range of the subsequently displayed block so as to include the entirety of the image irrespective of the predetermined amount of movement.

9. The scroll display program according to claim 1, wherein, when a part of an image is included in the subsequently displayed block, the range identifying module reduces a range of the subsequently displayed block so that the subsequently displayed block immediately follows the image irrespective of the predetermined amount of movement.

10. A scroll display device, comprising:
a storage unit configured to store a document to be displayed in a predetermined display area on a display;
an instruction acknowledging unit configured to receive a scroll instruction signal for scrolling the document displayed in the display area;
a range identifying module configured to refer to the document in the memory and identify, in accordance with a predetermined amount of movement, a previously displayed block displayed in the display area before scrolling and a subsequently displayed block displayed in the display area as updated by the scrolling; and
a delay control module configured to cause the previously displayed block to be scrolled in the display area by the predetermined amount of movement and displayed accordingly, and causing the subsequently displayed block to be scrolled and displayed accordingly with a delay from the previously displayed block,
wherein the delay control module causes the previously displayed block and the subsequently displayed block to be moved in the display area while the document is being scrolled, causing a line spacing between the previously displayed block and the subsequently displayed block to grow larger than a static line spacing between the blocks when the document is displayed in a static manner, and, after scrolling is completed, shrinking the line spacing between the blocks to the size of the static line spacing.

11. An electronic terminal provided with the scroll display device according to claim 10.

12. A scroll display method comprising:
storing in a memory a document to be displayed in a predetermined display area on a display;
receiving a scroll instruction signal for scrolling the document displayed in the display area;
referring to the document in the memory and identifying, in accordance with a predetermined amount of movement, a previously displayed block displayed in the display area before scrolling and a subsequently displayed block displayed in the display area as updated by the scrolling; and
outputting an image signal to the display, the image signal causing the previously displayed block to be scrolled in the display area by the predetermined amount of movement and displayed accordingly, and causing the subsequently displayed block to be scrolled and displayed accordingly with a delay from the previously displayed block,
wherein the previously displayed block and the subsequently displayed block are moved in the display area while the document is being scrolled to cause a line spacing between the previously displayed block and the subsequently displayed block to grow larger than a static line spacing between the blocks when the document is displayed in a static manner, and, after scrolling is completed, shrinking the line spacing between the blocks to the size of the static line spacing.

* * * * *